(12) United States Patent
Cotton

(10) Patent No.: US 8,225,436 B1
(45) Date of Patent: Jul. 24, 2012

(54) RACK MOUNTED PORTABLE PRESSURIZED SOLAR SHOWER

(76) Inventor: Joel Brian Cotton, Silt, CO (US)

( * ) Notice: Subject to any disclaimer, the term of this patent is extended or adjusted under 35 U.S.C. 154(b) by 346 days.

(21) Appl. No.: 12/381,989

(22) Filed: Mar. 19, 2009

Related U.S. Application Data

(60) Provisional application No. 61/058,992, filed on Jun. 5, 2008.

(51) Int. Cl.
*A47K 3/28* (2006.01)

(52) U.S. Cl. .............. 4/602; 4/599; 4/617; 4/597; 4/598

(58) Field of Classification Search .............. 4/602, 599, 4/617, 597, 598; 166/308.6; 126/621, 615, 126/626

See application file for complete search history.

(56) References Cited

U.S. PATENT DOCUMENTS

| | | | |
|---|---|---|---|
| 1,373,598 A | 2/1921 | Simeon Buka | |
| 3,483,541 A | 12/1969 | Cox, Jr. | |
| 3,513,828 A | 5/1970 | Masters | |
| 4,413,363 A | 11/1983 | Troiano | |
| 4,457,553 A * | 7/1984 | Larkin | 296/160 |
| 4,520,793 A | 6/1985 | Hall | |
| 4,524,893 A | 6/1985 | Cole | |
| 4,975,992 A | 12/1990 | Patterson et al. | |
| 5,012,536 A * | 5/1991 | Rivera | 4/605 |
| 5,507,275 A | 4/1996 | Clark | |
| 5,911,520 A * | 6/1999 | Kenney | 4/615 |
| 6,049,919 A * | 4/2000 | Roteman | 4/602 |
| 6,295,663 B1 | 10/2001 | Haller et al. | |

* cited by examiner

*Primary Examiner* — Gregory Huson
*Assistant Examiner* — Lauren Heitzer

(57) ABSTRACT

A portable pressurized solar shower which is mounted on the roof of a vehicle using roof rack mounting hardware. The vessel is an elongated shape such as a pipe (20), which is capped on both ends (32) (33). It can be filled by removing a fill cap (36) on top. Water can be sprayed out using an attached hose (60) and nozzle (70). Part of the vessel is a clear tube (41). Sunlight comes through a clear tube and heats a black surface (42) inside of the tube which heats the water. The vessel can be pressurized by a hand air pump via a valve stem (39) installed on the vessel. Privacy while showering is afforded by an attached shower curtain (86) that is easy to set up by using the easy to adjust curtain frame (80).

6 Claims, 4 Drawing Sheets

RACK MOUNTED PORTABLE PRESSURIZED SOLAR SHOWER

CROSS-REFERENCE TO RELATED APPLICATIONS

This application claims the benefit of provisional patent application 61/058,992 filed 2008 Jun. 5 by the present inventor.

FEDERALLY SPONSORED RESEARCH

Not Applicable

SEQUENCE LISTING OR PROGRAM

Not Applicable

BACKGROUND OF THE INTENTION

1. Field of Portable Solar Shower

This portable solar shower pertains to equipment for storing and dispensing water when access to a permanent water supply or shower is not readily available and more particularly to a pressurized solar heated shower.

2. Prior Art

Attaching objects to a vehicle roof rack is known. One such device disclosed in U.S. Pat. No. 4,524,983 which shows a method for attaching a bicycle to a vehicle roof rack.

Portable showers are known. One such device disclosed in U.S. Pat. No. 4,413,363. While it is portable, it depends on a municipal water supply to provide water. Another device, disclosed in U.S. Pat. No. 1,372,598, includes a fuel burning water heater and a hand pump. It is large and difficult to transport.

Pressurized portable showers are known. One example of such a shower is found in U.S. Pat. No. 3,483,571, which shows a large spherical tank that is suspended over a fire and pressurized with a valve stem of the type used to pressurize a tire. Others, such as that shown in U.S. Pat. No. 5,911,520, use a hand pump to provide pressure to the water tank.

Solar heated showers have heretofore been provided for use by campers, backpackers, and boaters and the like. Some devices convert solar energy to electricity and then the electricity to heat the water. Others, such as those disclosed in U.S. Pat. Nos. 4,471,759, 4,143,644, 3,513,828, and 1,042,418 heat water radiantly. One example of such a shower is found in U.S. Pat. No. 4,520,793, which is a flexible bag containing a spray hose for spraying water onto a bather. It is designed to heat water inside by exposure to the sun and then be hung above the user for gravity to provide water flow. The backing is usually black in color and functions as an solar absorber.

Pressurized and portable solar showers are known. One example is found in U.S. Pat. No. 5,507,275. While it uses the sun to heat the water, the pressure comes from a hose connected to a municipal water supply. While this device may work well in near a back yard swimming pool, it cannot be used where there is not a supply of pressurized water. It is also rather bulky and cumbersome to set up. Another example is found in U.S. Pat. No. 6,049,919, which uses a large bucket type container that is painted black on the inside and uses a clear top to admit solar energy. It uses a pump to provide pressure, which requires an electrical source. This restricts its use to locations with a source of electricity.

Another pressurized and portable solar shower is found in U.S. Pat. No. 6,295,663. This appears to be an improvement on the shower that is found in U.S. Pat. No. 4,520,793, the flexible bag shower. The '663 device overcomes the low pressure shortcoming of the '793 device by adding a pressurized bladder that is inflated with an air pump. However, both of these devices have the following shortcomings. If you transport them full of water, the vinyl is easy to puncture and prone to leaks. The vinyl plugs are difficult to seal and sometimes leak. They are hard to fill by one person, holding up the bag with one hand and using the hose with the other hand, usually filling to overflowing while the hose continues to flow. Another problem with this device is when a person is ready to use the shower, one must find a suitable structure or tree that is strong enough to hold up a shower that may weigh 40 lbs. A tree may be impossible to find in the desert. Then, a person must find a way to lift it over one's head and tie it to the structure. This is a difficult feat for one person. Then, one must crouch low to take a shower, if it is not tied high enough. In addition, the pressure is low since these showers rely on gravity, thereby making it difficult to rinse shampoo from one's hair.

A draw back of all of the solar showers is they need to be set out in the sun for several hours for the water to get warm. If you are driving or boating for long periods of time and arrive at camp at dusk, there may not be enough time to set out the shower and heat the water.

More complex apparatus include frame structures for hanging curtain material to provide privacy when using an outdoor shower system. An example is a portable shower that fits in a suitcase like enclosure and expands to a functional shower stall in U.S. Pat. No. 4,975,992. The problem with this device is that it is large and time consuming to set up.

Many such systems are known. U.S. Pat. No. 4,457,553 provides a shower stall that is mounted from the roof of a van. While this system is somewhat easier to set up, it requires special hardware mounted to the roof of the van.

BACKGROUND OF PORTABLE SOLAR SHOWER

Objects and Advantages

Several objects and advantages of the present portable solar shower are:
 (a) to provide a means of transporting water for use in drinking and bathing which is easy to access and transport.
 (b) to provide a solar-heated shower that can be transported on a vehicle roof rack while full of water and warms up while a person is traveling, so it is warm and ready to use when they reach their destination.
 (c) to provide a solar-heated shower that requires little set up time or effort, once it is initially attached to the vehicle.
 (d) to provide a solar-heated shower which provides ample water pressure from pressurization and/or gravity.
 (e) to provide a solar-heated shower system that provides for adequate privacy.
 (f) to provide a solar-heated shower that is easy to fill up with water and easy to spray water from.
 (g) to provide a solar-heated shower that is durable and not easily punctured.
 (h) to provide a solar-heated shower that can attach to a vehicle roof top rack, whether it is a small car, a van, truck, camper, or attach to a rail of a boat, or attach to other structures with rails or bars.
 (i) to provide a solar-heated shower that does not interfere with other roof top attachments.

Still further objects and advantages will become apparent from a consideration of the ensuing description and drawings.

SUMMARY

In accordance with the present portable solar shower there is provided a portable solar shower apparatus that can be mounted on a vehicle. This apparatus comprises a pressure vessel capable of withstanding pressure of at least 40 PSI. This vessel is formed by a pipe that is capped on both ends and has a section of a clear plastic acrylic tube partially painted black on the inside, which allows for the absorption of solar energy. Said vessel is attached to car top rack mounting hardware and mounted on a car rack. A shower curtain for privacy is incorporated.

DRAWINGS

Figures

The present portable solar shower can be more readily understood by a consideration of the following detailed description when taken in conjunction with the accompanying drawings in which.

Figure 1:
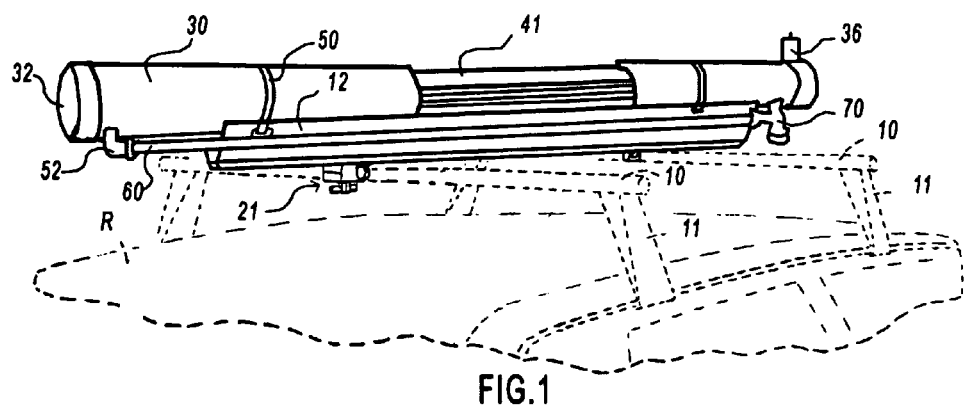
FIG. 1 is a perspective drawing of the portable solar shower mounted in accordance with a preferred embodiment of the present portable solar shower, showing a pressure vessel with a solar window and attached hose and sprayer, mounted on a vehicle roof rack.

| DRAWINGS - Reference Numerals | |
|---|---|
| 10 | vehicle roof rack cross bar |
| 11 | vehicle roof mounting brackets |
| 12 | roof rack mounting trough |
| 13 | mounting bolt |
| 14 | slot at the forward end of the trough |
| 15 | clamp bracket |
| 16 | cylindrical hole |
| 17 | upper plate |
| 18 | lower plate |
| 19 | wall defining bore |
| 20 | nut |
| 21 | mounting hardware |
| 30 | pressure vessel |
| 32 | end cap |
| 33 | end cap |
| 34 | threaded nipple |
| 36 | threaded pressure cap |
| 39 | valve stem |
| 40 | pressure relief valve |
| 41 | acrylic solar tube |
| 42 | black paint inside tube |
| 46 | temperature gauge |
| 47 | pressure gauge |
| 50 | band clamp |
| 51 | hole in trough for band clamp |
| 52 | elbow connector |
| 60 | hose |

| DRAWINGS - Reference Numerals | |
|---|---|
| 62 | hose mount |
| 70 | spray nozzle |
| 80 | shower curtain frame |
| 82 | shower curtain frame side piece |
| 83 | shower curtain frame back piece |
| 84 | shower curtain frame adjuster piece |
| 86 | shower curtain |
| R | roof of vehicle |

DETAILED DESCRIPTION

FIGS. 1, 2, 3, 4A, 4B, 4C

Referring more particularly to the FIG. 1, reference R indicates the roof of an automobile on which there is a portable roof rack or permanent luggage rack attached. There is a pair of forward mounting brackets 11 and rear mounting brackets 11. Spanning each pair of mounting brackets is a tubular crossbar, there being a front crossbar 10 and a rear crossbar 10, both hollow pipes. is attached to roof rack mounting trough 12. Roof rack mounting trough 12 is attached by mounting hardware 21.

Figure 2:
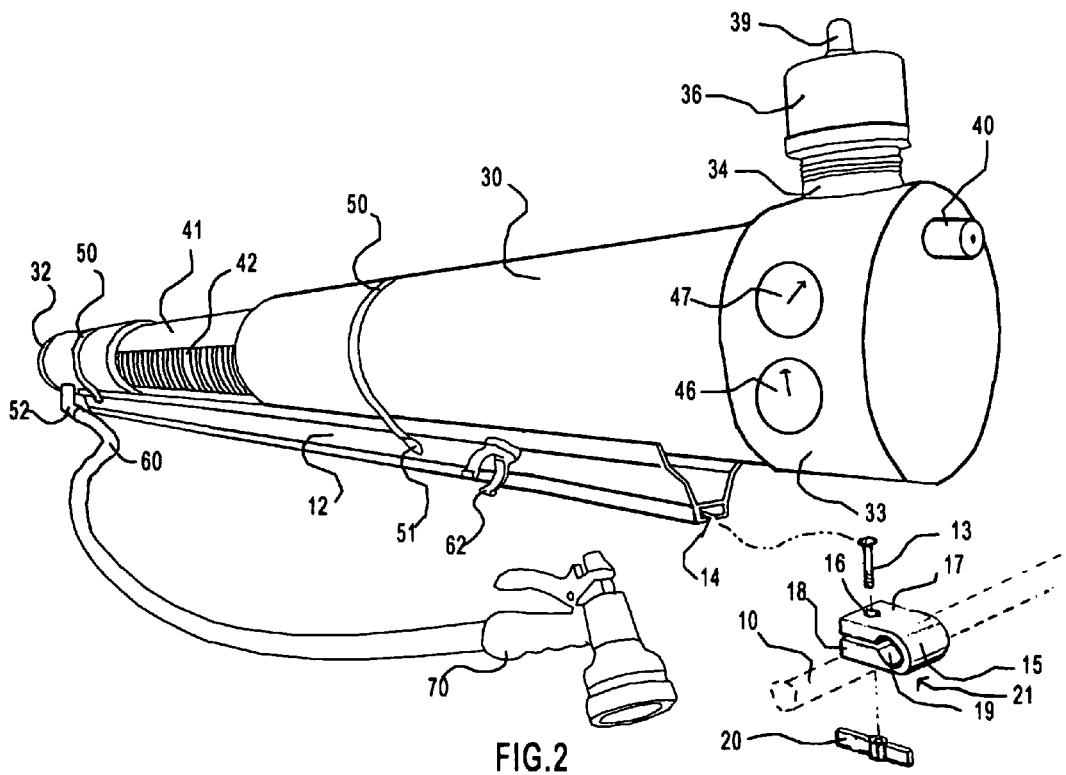
FIG. 2 is a perspective drawing of the portable solar without the vehicle roof rack, showing the fill cap with pressurization valve, rack mounting hardware, shower nozzle and attachment, pressure relief valve, solar collecting tube, and method of attaching the pressure vessel to the rack mounting hardware.

Referring to FIG. 2, a more detailed view of the mounting is shown. A mounting bolt 13 slides within slot 14 at the forward end of trough 12. The portion of bolt 13 that extends below the trough is received in a clamp bracket 15 which is made of elastic material such as nylon or the like. The clamp bracket defines a generally cylindrical hole 16 that as an inner diameter corresponding to the outer of crossbar 10. Clamp bracket 15 is split to form an upper plate 17 and lower plate 18. Plates 17 and 18 are drilled to receive bolt 13 and there is a nut 20 adapted for threaded engagement with the bolt 13. When nut 20 is tightened plates 17 and 18 are drawn toward one another so that the wall defining bore 19 firmly grips crossbar 10.

The Pressure vessel 30 is attached to the trough 12, by band clamps or hose clamps 50 in 2 spots. The hose clamps wrap around the vessel and through a hole 51 drilled through the trough 12 and are tightened to hold the vessel securely.

In FIG. 2, the Pressure vessel 30 is a pipe fitted with end caps 22 and 23. The pipe is made from a plastic material that insulates well such as ABS or PVC. A threaded nipple 34 is installed at the top of one of the end caps. A threaded pressure cap 36 is screwed on to the nipple and can be taken on and off in order to fill the vessel 30 with water and to keep the water inside as well as hold the air pressure. A threaded valve stem 39 of the type used to inflate tires is installed at the top of the threaded pressure cap 36. Pressure can be introduced through the valve stem 39 by use of a hand tire pump, or a compressor. A pressure relief valve 40 is installed in end cap 33 which will relieve pressure if too much air is pumped into the vessel, thereby preventing an explosion. Pressure can be monitored by pressure gauge 47 installed on end cap 33.

In FIG. 2, at the other end of the pressure vessel an elbow 52 is installed in end cap 32 to which a hose 60 can be connected. A garden spray nozzle 70 is then attached to the hose. In FIG. 2, a hose mount 62 is attached to the trough 12 to provide a place to hang the hose 60 and nozzle 70 while not in use and during transportation.

The means for heating the water is shown in FIG. 2. The solar collector 41, is a clear tube made of acrylic or other clear material, which has the lower half painted black 42. The paint is on the inside of the tube. When the sun enters the top or the sides of the tube, it strikes the black paint on the inside 42 and warms it. The paint is in direct contact with the water and warms the water. The water gains more heat than it loses since the pressure vessel 30 is made of material that insulates well. Temperature can be monitored by temperature gauge 46 installed in end cap 33.

Figure 3:
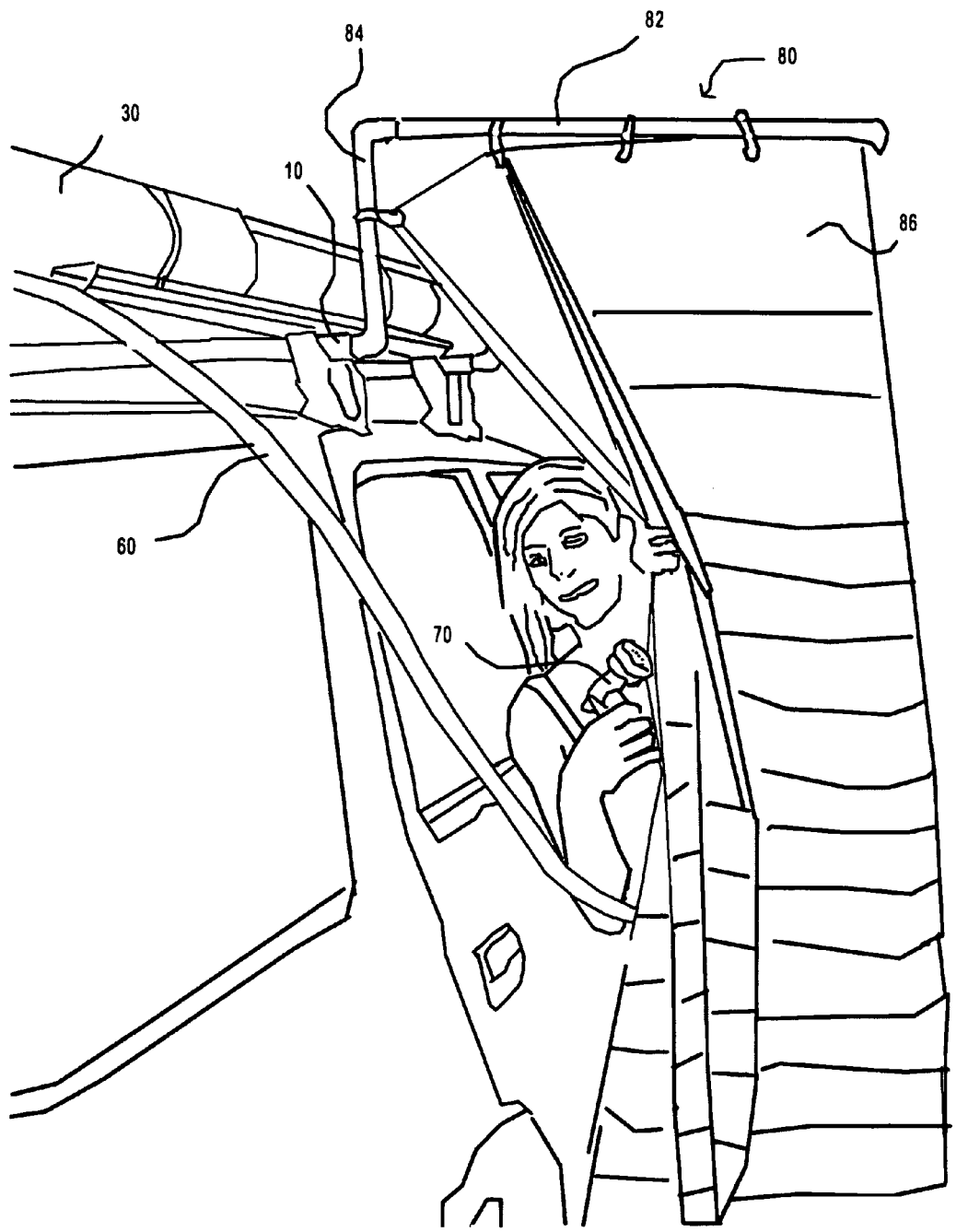
FIG. 3 is a perspective drawing of the shower curtain which is attached to the roof rack.
Figure 4A:
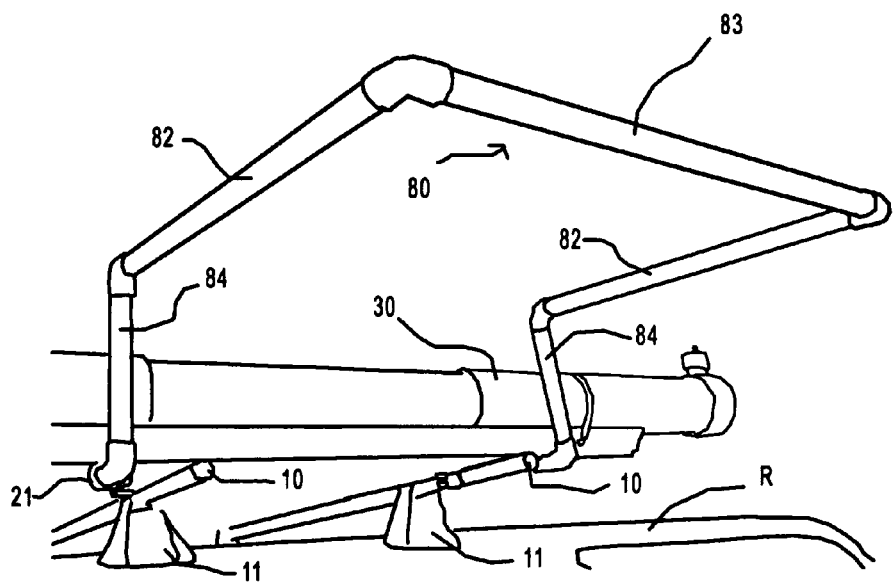
FIG. 4A is a drawing of the shower curtain frame without the curtain.
Figure 4B:
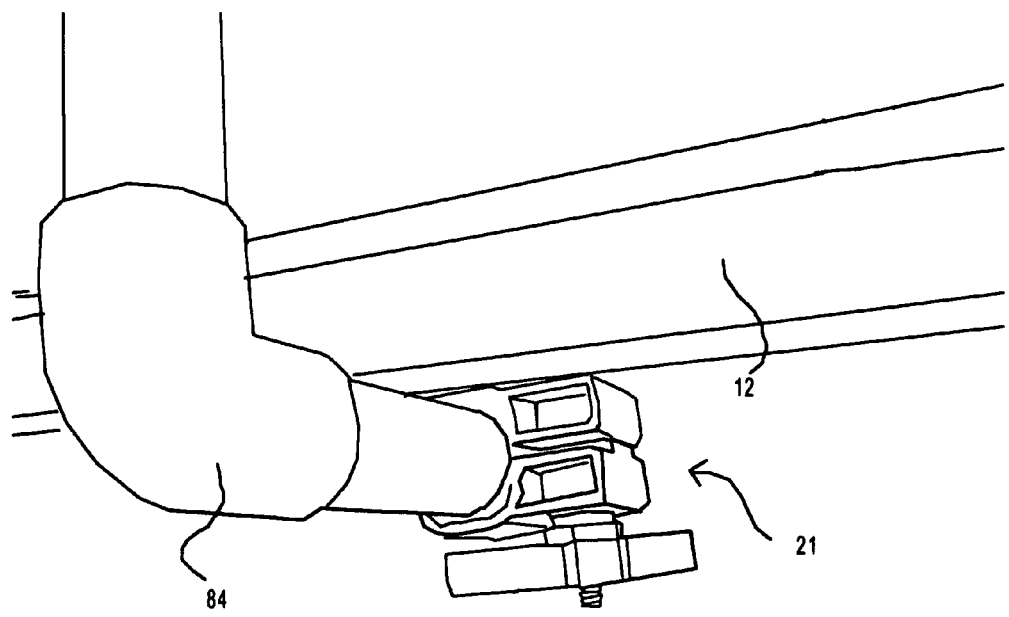
FIG. 4B is a close up drawing of the how the shower curtain frame attaches to the solar shower.
Figure 4C:
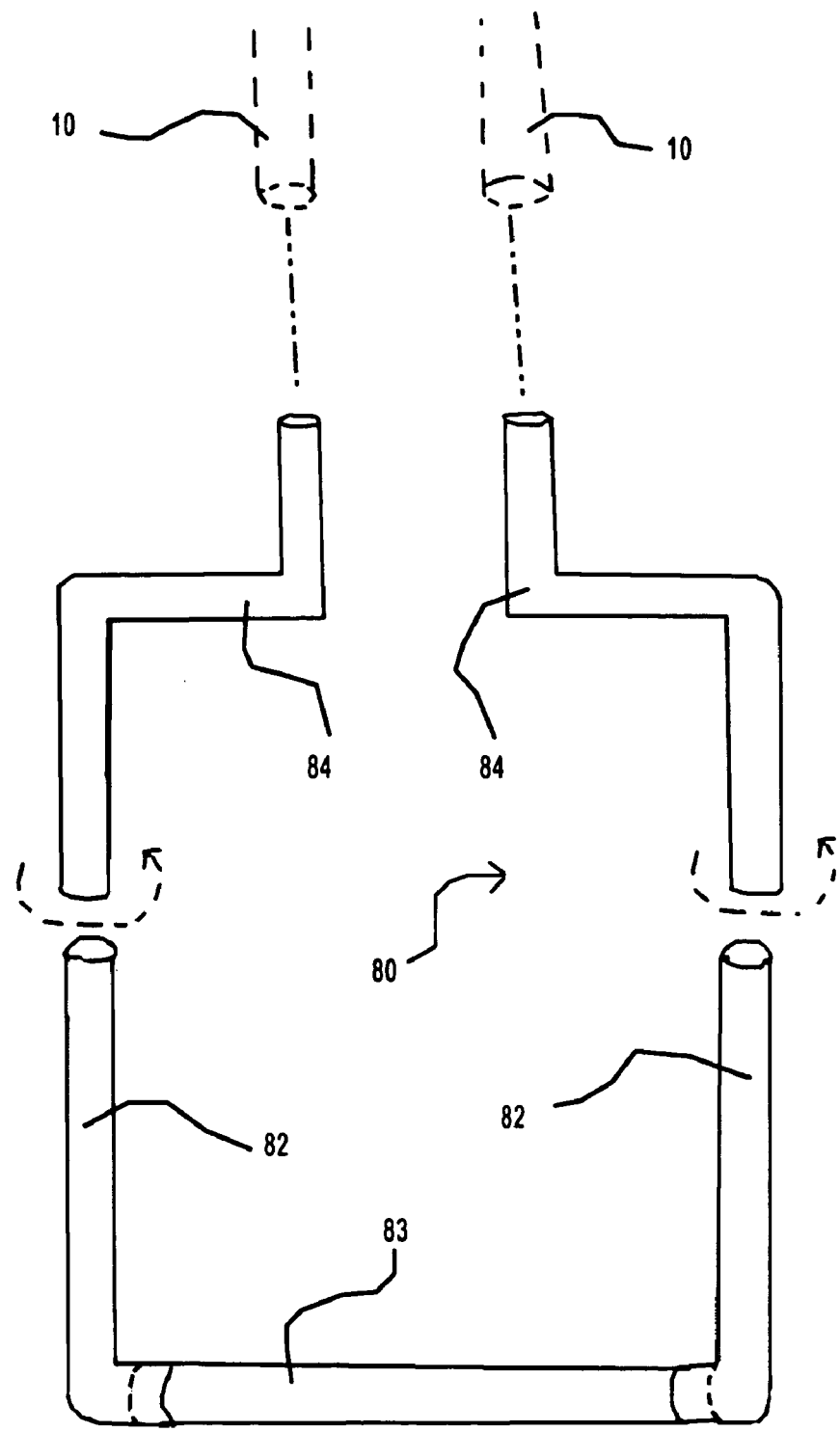
FIG. 4C is a drawing of the how the shower curtain frame adjusts to the width of the roof rack crossbars.

FIG. 3 shows the shower curtain 86 and curtain frame 80 deployed. The shower curtain 86 and the frame 80 provide privacy while using the shower. Frame parts 82, 83, and 84 are constructed of plastic or metal tubing. FIG. 4C shows both frame parts 84 slide into the ends of crossbar 10, thereby providing support to the entire shower curtain frame. Some roof racks do not have hollow crossbars. In these cases, the curtain frame can be attached to an extra pair of mounting hardware 21. This is the same kind of hardware which attaches the trough 12 to the crossbar 10. FIG. 4A shows the shower frame deployed without the curtain. FIG. 4B shows detail on how the curtain frame 80 is connected to the mounting hardware 21. Notice that 2 sets of extra mounting hardware 21, is attached to trough 12, when the shower curtain is to be deployed. FIG. 4C shows that shower curtain frame can be adjusted to fit the width of the crossbars 10 or mounting hardware 21 on the vehicle, since the crossbar width will vary from vehicle to vehicle. The shower curtain frame pieces 84 can be rotated to the correct width prior to attaching them to shower curtain frame pieces 82. Once deployed all shower curtain frame pieces are attached. The end diameters of the tubing are made smaller to slide inside the opposing piece as is commonly found with tent poles, in order to attach them.

Alternative Embodiments

Pressure vessel 30 could be made with a flatter shape, longer, wider or shorter, thereby improving the solar collection efficiency. There are other means of mounting devices on roof racks, and this portable solar shower could have made use of these other means just as easily as the one used in the preferred embodiment. Pressure vessel 30, could be removed from the vehicle rack and used at a camp or a cabin. Spray nozzle 70 could be substituted by a shower head or other types of spray nozzles.

Advantages

From the description above, a number of advantages of my rack mounted pressurized solar shower become evident:
  a) While camping, most people carry water in jugs, which necessitates setting the jug on the ground or a table, lifting it and pouring water into a suitable container. The use of a water container mounted on a roof rack means that water is always available for drinking, washing, or bathing by simply removing the spray nozzle from the mount and spraying water out.
  b) While every other portable solar shower must be set out in the sun and kept stationary for the period of time necessary to heat the water, the water in my portable solar shower will heat up while a person is driving and will be warm when the destination is reached.
  c) Other types of portable showers must be set up in some fashion, in order to use them.
The advantage of my portable solar shower is that once the shower is mounted to the roof of the vehicle, it is ready for use from that point forward, and no further set up is required, unless the shower curtain is deployed. It can be used from one location to the next without further effort.
  d) Most truly portable solar showers use gravity for creating water pressure. The disadvantage that it is difficult and time consuming to take a shower, particularly in regards to shampooing one's hair. While this portable solar shower can use gravity for pressure, it has the added feature of being able to pressurize it with a hand pump or compressor, thereby creating high pressure.
  e) The bag style solar showers are difficult to fill and they are not easy to spray water from. My portable solar shower is as easy to fill as a water jug, and as easy to spray as a garden spray nozzle.
  f) Bag style solar showers are made from vinyl and can be easily punctured while carried full in the back of a vehicle with other camping equipment, such as shovels, bicycles, etc. My portable solar shower is made of hard durable material and cannot be punctured. It is transported on top of the vehicle, out of the way of the other gear.
  g) Since it may be difficult to find privacy while showering next to your car, a shower curtain system is provided as part of this portable solar shower.
  h) While many people may carry other attachments to their roof rack, such as luggage carriers and bicycles, this portable solar shower is designed to take up minimal space and it has little interference with other rack attachments.

CONCLUSION, RAMIFICATION, AND SCOPE

Accordingly, the reader will see that the rack mounted pressurized solar shower can be used as a convenient liquid transportation system for camping. The vessel with or without solar collector could also be used to transport spare water for drinking, bathing, or cooking, when water facilities are not available. The vessel, without the solar collector, and without pressurization, could be used to transport and dispense fuel, such as gasoline, when traveling in remote areas and fuel stations are not available.

The rack mounted pressurized solar shower could have many uses beyond what has been specified in this application. For example, it could be carried on vehicles that service oil rigs, and used as an emergency shower in the event of toxic spill on a person. It could be used on Forest Service vehicles as a tool for emergency fire suppression. Potential uses should not be limited by the scope of the descriptions in this application.

Though the rack mounted pressurized solar shower mounts easily to the roof rack of a vehicle, it can just as easily mount to the rail of a boat, a rail of a trailer, bed of a pick up truck, etc. While the advantages of transporting this portable solar shower are numerous, it could also be mounted with mounting bolts screwed into wood on a cabin, or a remote camp and provide a satisfactory solution for a shower. While the preferred embodiment shows the portable solar shower mounted to a car, it should not be limited to a car.

Although the description above contains much specificity, these should not be construed as limiting the scope of the portable solar shower but as merely providing illustrations of some of the presently preferred embodiments of this portable solar shower.

Thus, the scope of the portable solar shower should be determined by the appended claims and their legal equivalents, rather than by the examples given.

I claim:
1. A car top solar shower which mounts to an existing vehicle top luggage rack's crossbars, which remains securely in place and can heat water while the car is in motion comprising:

- An elongated vessel which is a rigid sealed tube capable of holding water wherein a section of the sealed tube is clear which allows sunlight to shine through, and contains a dark material on the inside bottom surface in order to absorb the sunlight to heat the water;
- An elongated u-shaped rigid open ended trough to which the vessel is attached parallel to a longitudinal axis of the trough;
- A means to attach the trough to the crossbars of vehicle luggage rack; the trough is longitudinally oriented to the vehicle in order to reduce wind resistance.

2. The solar shower of claim 1, comprising a fill cap is used for filling the vessel and a hose for dispensing the liquid from the vessel on the vehicle.

3. The solar shower of claim 1, comprising a valve stem for pressurizing the vessel and a pressure relief valve to prevent a rupture of the vessel.

4. The solar shower of claim 1, wherein the trough has a pair of holes in the side of the trough located near both ends to admit a band clamp through the holes and around the vessel in order to clamp the vessel tight to the trough; wherein said trough includes a slot on the underside of the trough.

5. The solar shower of claim 4, wherein the means include a mounting bolt having a bolt head which slides within the slot at the end of the trough; threads of the bolt that extend below the trough and through an elastic clamp bracket; the clamp bracket includes a wall defining bore which wraps around the crossbar of the vehicle crossbars; the clamp is split to form an upper plate and lower plate which are drilled to receive the mounting bolt; a nut is adapted for threaded engagement with the bolt; when tightened the plates are drawn together and firmly grasp the crossbar of the vehicle rack.

6. The solar shower of claim 1, wherein the trough is attached firmly to the vessel wherein said trough includes a slot on the underside of the trough.

* * * * *